United States Patent
Miller et al.

(10) Patent No.: US 6,448,731 B1
(45) Date of Patent: Sep. 10, 2002

(54) APPARATUS AND METHOD FOR CONTROLLING AN ELECTRIC MOTOR

(75) Inventors: Joseph D. Miller, Farmington Hills; Kevin M. McLaughlin, Troy, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/601,172

(22) PCT Filed: Feb. 10, 2000

(86) PCT No.: PCT/US00/03378

§ 371 (c)(1),
(2), (4) Date: Jul. 28, 2000

(87) PCT Pub. No.: WO00/48047

PCT Pub. Date: Aug. 17, 2000

Related U.S. Application Data

(60) Provisional application No. 60/119,784, filed on Feb. 11, 1999.

(51) Int. Cl.[7] .............................. G05B 4/00; H02H 7/08; H02P 1/04; H02P 3/00; H02P 7/00
(52) U.S. Cl. ....................................................... 318/488
(58) Field of Search .......................................... 318/488

(56) References Cited

U.S. PATENT DOCUMENTS

| | | |
|---|---|---|
| 4,660,671 A | 4/1987 | Behr et al. |
| 4,719,396 A | 1/1988 | Shimizu |
| 4,895,216 A | 1/1990 | Fusimi et al. |
| 5,355,315 A | 10/1994 | Daido et al. |
| 5,361,210 A | 11/1994 | Fu |
| 5,475,289 A | 12/1995 | McLaughlin et al. |
| 5,504,404 A | 4/1996 | Tamaki et al. |
| 5,656,911 A | 8/1997 | Nakayama et al. |
| 5,670,854 A | 9/1997 | Matsuura et al. |
| 5,689,170 A | 11/1997 | Ishikawa |
| 5,701,066 A | * 12/1997 | Matsuura et al. |
| 5,726,545 A | 3/1998 | Iwashita et al. |
| 5,747,957 A | 5/1998 | Hayashida |
| 5,787,376 A | 7/1998 | Nishino et al. |
| 5,796,228 A | 8/1998 | Kojima et al. |
| 5,877,603 A | 3/1999 | Uchida et al. |
| 5,913,913 A | 6/1999 | Okanoue et al. |
| 6,152,255 A | * 11/2000 | Noro et al. |

FOREIGN PATENT DOCUMENTS

| | | |
|---|---|---|
| JP | 07115788 | 5/1995 |
| JP | 08107602 | 4/1996 |
| JP | 08205388 | 8/1996 |
| JP | 08251975 | 9/1996 |
| JP | 09074793 | 3/1997 |
| JP | 09172703 | 6/1997 |

\* cited by examiner

*Primary Examiner*—Jeffrey Donels
(74) *Attorney, Agent, or Firm*—Tarolli, Sundheim, Covell, Tummino & Szabo L.L.P.

(57) ABSTRACT

An electric assist steering system (10) includes a torque sensor (16) that provides an applied torque signal (24) indicative of applied steering torque. A motor position sensor (36) provides a motor position signal (40) indicative of the relative position between the rotor and the stator of an AC permanent magnet electric assist motor (22). A first controller (26) controls energization of the electric assist motor and a second controller (54) calculates a DQ vector value in response to applied steering torque and motor position. The second controller (54) also transforms the monitored motor current and position into DQ values. The second controller (54) compares the DQ values responsive to applied steering torque with the DQ value from monitored motor current and position. The electric assist motor (22) is disabled if the comparison indicates inconsistent results.

15 Claims, 2 Drawing Sheets

APPARATUS AND METHOD FOR CONTROLLING AN ELECTRIC MOTOR

RELATED APPLICATIONS

This application claims priority from U.S. Provisional patent application Ser. No. 60/119,784, filed Feb. 11, 1999 and PCT Patent Application No. 00/03378, filed Feb. 11, 2000, entitled "Means for Attaching a Pre-assembled or Integral Steering Wheel Assembly onto the Steering Column Shaft Using Conventional Coupling Means".

TECHNICAL FIELD

The present invention relates to an apparatus and method for controlling an electric motor and, more particularly, to a method and apparatus for controlling an electric assist motor in an electric assist steering system.

BACKGROUND OF THE INVENTION

Motor control systems for electric assist steering systems typically are equipped with various circuitry and controls for monitoring and detecting abnormal conditions in the electric motor being monitored. For example, it may be desirable to detect when the electric motor is not commutating properly or when the motor or the drive circuitry has overheated. U.S. Pat. No. 5,257,828 and U.S. Pat. No. 5,517,415, both to Miller et al. and assigned to TRW Inc., disclose approaches for detecting abnormal conditions in an electric assist steering system and for controlling the electric assist motor accordingly.

U.S. Pat. No. 5,726,545 discloses a method for controlling electric current in a servo motor using DQ conversion for converting three-phase current into a two-phase DQ reference coordinate.

U.S. Pat. No. 5,670,854 to Matsuura et al. discloses a control system for an induction motor in an electric assist steering systems where the induction motor does not include permanent magnets. The Matsuura et al. patent further discloses using DQ conversion in the control process for the electric assist motor.

SUMMARY OF THE INVENTION

The present invention is directed to a method and apparatus for controlling an electric assist steering system. A first set of motor control values are determined in response to applied steering torque. The electric motor is energized in response to this first set of motor control values. When the motor is energized, it has motor operating values. Motor control values are determined from the motor operating values. A second set of motor control values are determined in response to applied steering torque. The motor is disabled when the determined motor control values from the motor operating values is inconsistent with the determined second set of motor control values responsive to applied steering torque.

In accordance with another embodiment, motor current control values are determined in response to applied steering torque. A DQ controller transforms the determined current control values into three-phase drive signals which are applied to the motor. DQ values are determined from the monitored motor current and position values. DQ values are determined in response to applied steering torque. The DQ values responsive to applied steering torque are compared against the DQ values responsive to monitored motor current and position. The motor is disabled if the comparison indicates an inconsistency.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF A PREFERRED EMBODIMENT

Figure 1:
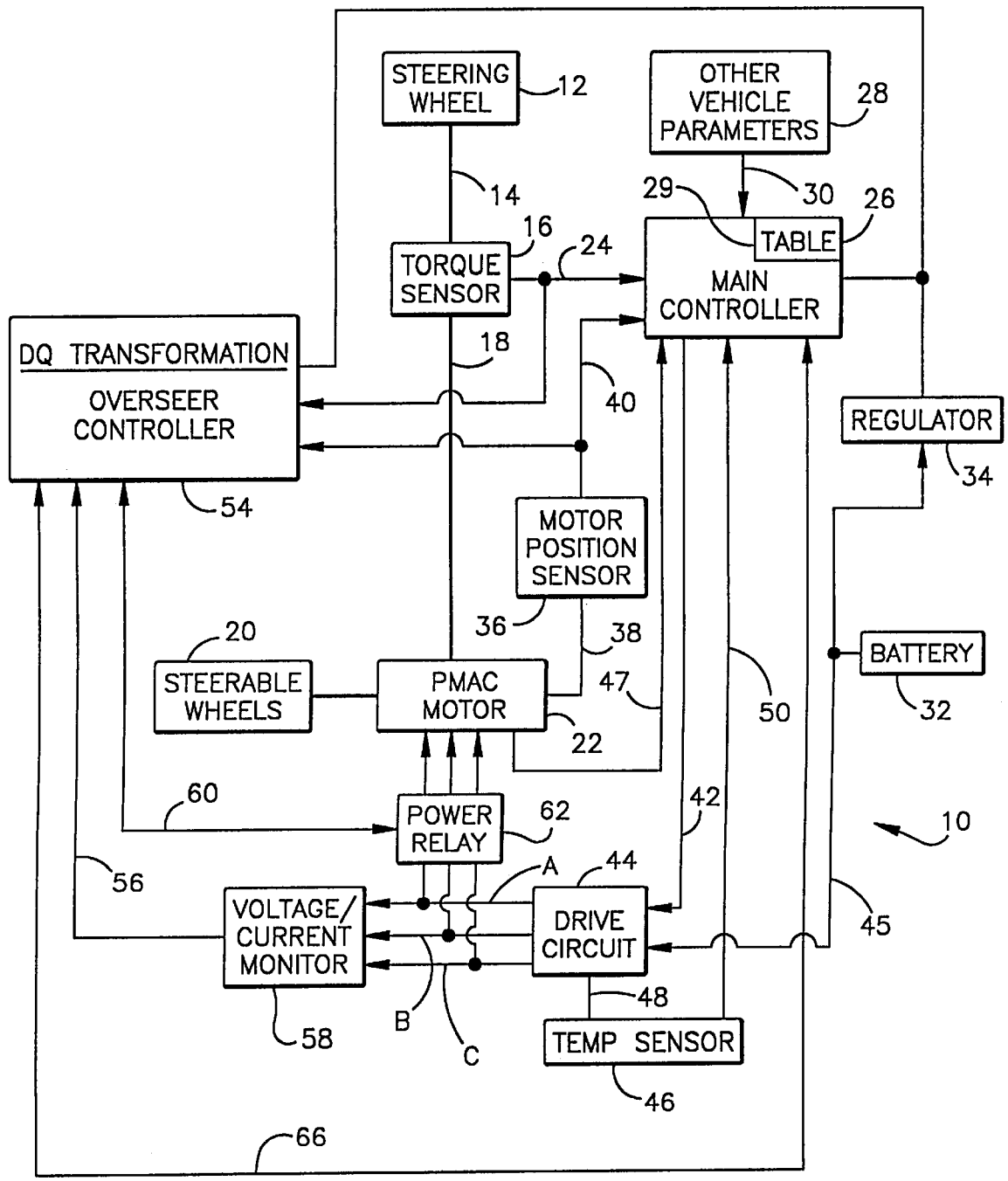
FIG. 1 is a schematic representation of a system in accordance with a preferred embodiment of the present invention.

FIG. 1 illustrates a vehicle electric assist steering system 10 that includes a vehicle steering wheel 12 connected to an input shaft 14. The input shaft 14 is operatively connected to a pinion shaft 18 through a torsion bar (not shown). The torsion bar twists in response to the torque applied to the vehicle steering wheel 12 to permit relative rotation between the input shaft 14 and an output shaft 18 in a known manner. A torque sensor 16 is operatively connected to the input shaft 14 and the output shaft 18 to sense the applied steering torque. The output shaft 18 is operatively connected to steerable wheels schematically illustrated at block 20.

Steering assist is provided through energization of an electric motor 22. Preferably, the electric motor 22 is a multi-phase motor such as a three-phase permanent magnet alternating current ("PMAC") motor of known configuration with phases A, B, and C. The PMAC motor 22 includes a plurality of stator poles disposed in a generally circular array around a rotor. Each of the stator poles includes a plurality of conductive windings which form phases A, B, and C. The rotor is rotatably disposed within the stator housing to rotate about a central axis. The rotor also includes a plurality of spaced apart poles arranged in a generally circular array with permanent magnets disposed on each pole. When the stator windings are energized by appropriate AC signals, the energized stator poles create an electric field which effects rotation of the rotor.

The electric motor 22 may be operatively connected with a rack and pinion gear set of the vehicle. Alternatively, the motor 22 may be operatively connected with the steering column, such as to the pinion or output shaft 18. Advantageously, the system 10 may be used in accordance with the present invention with either a rack drive, pinion drive, column drive, or any type of electric assist steering system. The system 10 also may be adapted for use with an electric powered hydraulic steering system.

In order to control operation of the motor 22, the system includes the torque sensor 16 which senses the amount of steering torque applied to the steering wheel 12. The torque sensor 16 may be an inductive torque sensor, an optical torque sensor, a resistive torque sensor, or any other known type of torque sensor. The torque sensor 16 provides a signal 24 to a main controller 26 indicative of the amount of applied steering torque.

The controller 26 preferably is a microprocessor or microcomputer programmed for controlling the electric assist motor 22 in response to one or more input signals, including the torque sensor signal 24. Other vehicle parameters 28, such as from a vehicle speed sensor, soft start control circuitry, and/or other desirable vehicle condition parameters, provide signal(s) 30 to the controller 26 indicative of the sensed parameters. The controller 26 also includes memory having a look-up table 29.

The controller 26 receives electrical power from a power supply, such as the vehicle battery 32 that has been appropriately filtered and maintained as a desired voltage level through a voltage regulator 34.

A motor position sensor 36 is operatively connected with the electric assist motor 22 through connection 38. The motor position sensor 36 monitors the relative position of the rotor and the stator of the motor 22 and provides a motor position signal 40 to the controller 26.

The controller 26 determines a current command value in response to the applied input torque signal 24, the motor position signal 40, and signal 30. Specifically, the controller 26 is preprogrammed to determine a level of motor current, suitably from values stored in the look-up table 29, according to the input torque signal 24, the input position signal 40, and other parameter signals 30. The determined level of motor current energizes the electric assist motor 22 to provide an appropriate amount of steering assist.

A motor control arrangement for an electric assist steering system is disclosed in U.S. Pat. No. 5,475,289 to McLaughlin et al., which is assigned to TRW Inc. The McLaughlin et al. patent discloses an apparatus and method for deriving the current command value by interpolating between current profile curves which are stored in appropriate memory. The interpolation performed by the controller 26 is similar to that disclosed in the McLaughlin et al. patent and may be linear or non-linear. The controller 26 interpolates between current profile curves to derive a motor current command signal 42 for each of the plurality of phases of the motor 22.

The motor current command signal 42 is supplied to a drive circuit 44 which, in turn, provides an appropriate amount of electric current to each of the plurality of phases of the motor 22. The drive circuit 44 is electrically connected through electrical connection 45 to a power supply, suitably battery 32 or a voltage regulator. Preferably, the controller 26 includes a pulse-width-modulating circuitry that provides the output signal 42 in the form of a plurality of pulse-width-modulated signals. The pulse-width-modulated signals are provided to an array of switching devices, preferably FETs, which comprise the drive circuit 44. Accordingly, the FETs of the drive circuit 44 are pulse-width modulated by the current command signal 42 to provide a desired alternating current to each of the phases of the electric motor 22 at a level commensurate with the applied steering torque.

The controller 26 also is programmed to perform suitable diagnostics to ensure proper operation of the system 10 and, in particular, of the electric assist motor 22 and the drive circuit 44. In order to perform such diagnostics, the system 10 includes a temperature sensor 46 operatively connected to the drive circuit 44 by a connection schematically illustrated at 48. The temperature sensor 46 provides a temperature sensor signal 50 to the main controller 26 indicative of the temperature of the drive circuit 44.

The temperature sensing and diagnostic function preferably includes those disclosed in U.S. Pat. No. 5,257,828 to Miller et al. which is assigned to TRW Inc. and incorporated herein by reference. The system 10 also may include stall detection circuitry through which the controller 26 may detect a motor stall condition in the electric assist motor 22.

The stall condition, for example, may be detected by collectively monitoring the applied torque signal 24 in combination with sensing the commutation of the motor through a signal 47 from the motor 22 to the main controller 26. An example of a suitable stall detection operation is disclosed in U.S. Pat. No. 5,517,415 also to Miller et al., which is assigned to TRW Inc. and incorporated herein by reference. The stall detection function may also include a temperature dependent operation, whereby the system gain is controlled as a function of temperature.

In accordance with the present invention, the system 10 also includes a secondary or overseer controller 54. The secondary controller 54 operates to verify proper operation of the electric assist motor 22 in response to the applied torque signal 24. This, in turn, provides a system check on the control process performed by the main controller 26. The secondary controller 54 is electrically connected to a power supply, such as the voltage regulator 34.

The secondary controller 54, like the main controller 26, receives the torque sensor signal 24 and the motor position sensor signal 40 as inputs. These input signals enable the secondary controller 54 to determine a motor voltage or motor current value. The motor voltage or current value corresponds to a respective motor voltage or current that will provide the amount of steering assist corresponding to sensed input torque. Accordingly, the secondary controller 54 can compare the determined value with the actual motor voltage or current to determine if an abnormal condition exists.

The secondary controller 54 also receives a signal 56 indicative of a monitored value of the actual voltage and/or current of each of the plurality of phases A, B, and C of the electric assist motor 22. In the preferred embodiment of FIG. 1, the system includes a voltage or current monitoring device 58 that is electrically connected with and monitors a voltage or current condition of each phase A, B, and C of the electric assist motor 22. The monitoring device 58 provides the voltage or current signal 56 to the secondary controller 54. Preferably, the monitoring device 58 provides signals indicative of the actual instantaneous voltage value for each of the plurality phases A, B, and C of the electric assist motor 22. The monitoring device 58 also could be connected directly with the electric motor 22.

In response the applied torque and motor position signals 24 and 40, respectively, the secondary controller 54 determines a DQ vector quantity, which is a two-dimensional representation of the motor voltage or current according to the applied input torque and motor position. The secondary controller 54 converts the DQ voltage or current vector into a three phase voltage or current, depending on whether the monitoring device 58 is configured to provide voltage or current values. If the converted phase values agree with the monitored phase values from monitoring device 58, operation of the electric assist motor continues under the control of controller 26 uninterrupted. However, if the converted phase values differ from the monitored phase values by a predetermined amount, the secondary controller 54 determines the occurrence of an abnormality and provides a signal 60 to disable the electric assist motor 22.

Preferably, a power relay 62 is electrically connected with two or more phases of the electric assist motor 22 and responsive to the secondary controller 54. Accordingly, upon the power relay 62 receiving the disable command signal 60, the power relay opens to disconnect the electric assist motor 22 from its power supply 32, thereby removing steering assist. The vehicle can still be steered manually.

As stated above, the main controller 26 preferably utilizes a look-up table 29 to determine the current drive signals in response to input parameters so as to control the electric assist motor 22. Necessary input parameters include the applied torque signal 24 and the motor position signal 40.

Figure 2:
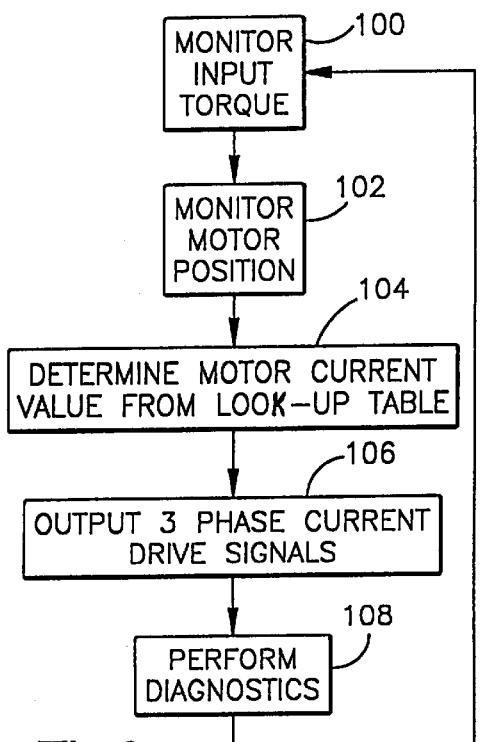
FIG. 2 is a flow diagram illustrating the operation of a first controller of the system of FIG. 1 in accordance with a preferred embodiment of the present invention.

Referring to FIG. 2, the process within the main controller 26 begins at step 100. In step 100, the applied input torque is monitored by the main controller 26 through the torque sensor signal 24. Next, at step 102, the main controller 26 monitors the relative position between the rotor and stator of the motor 22 through the motor position signal 40.

The process proceeds to step 104. In step 104, a motor current value is determined in response to the motor torque signal 24 and the motor position signal 40, preferably from the look-up 29 within the main controller 26. The actual control value will be interpolated for smooth control. Alternatively, rather than utilizing a look-up table, similar to that disclosed in U.S. Pat. No. 5,475,289, the controller 26 may mathematically calculate corresponding current values by known motor control algorithms. The current values correspond to the amount of current that is to be applied to the electric assist motor 22 by the drive circuit 44 in order to achieve the desired amount of steering assist.

The process proceeds to step 106 in which the main controller 26 outputs the current drive signal 42 which are provided to the drive circuit 44. The phase current drive signal 42 preferably is a plurality of pulse-width-modulated signals for gating the individual FETs that form the drive circuit 44. The PWM drive signals 42 gate the FETs so as to provide a desired AC signal for each of the motor phases. Preferably, drive circuit 42 provides AC current signals to each phase of the three phase electric motor 22, each signal being phase shifted by 120°. Accordingly, the FETs of the drive circuit 44 are controlled by the main controller 26 to provide an appropriate AC input current at each of the phases A, B, and C according to the applied input torque or any other desired vehicle parameters.

The process then proceeds to step 108 where the main controller 26 performs diagnostics. The diagnostics, for example, may include temperature sensing of the FETs in the drive circuit 44, stall detection of the electric assist motor 22 by signal 47 as well as other known diagnostic functions. Such diagnostics also may include monitoring a communication link 66 between the secondary controller 54 and the main controller 26. Pertinent data may be exchanged over the communication link 66 to enable the main controller 26 to diagnose a possible failure of the overseer 54. The secondary controller 54 also might monitor the operation of the main controller 26 so as to determine the existence of an abnormal condition in the main controller. Upon completing the desired diagnostics, the process returns to step 100.

Figure 3:
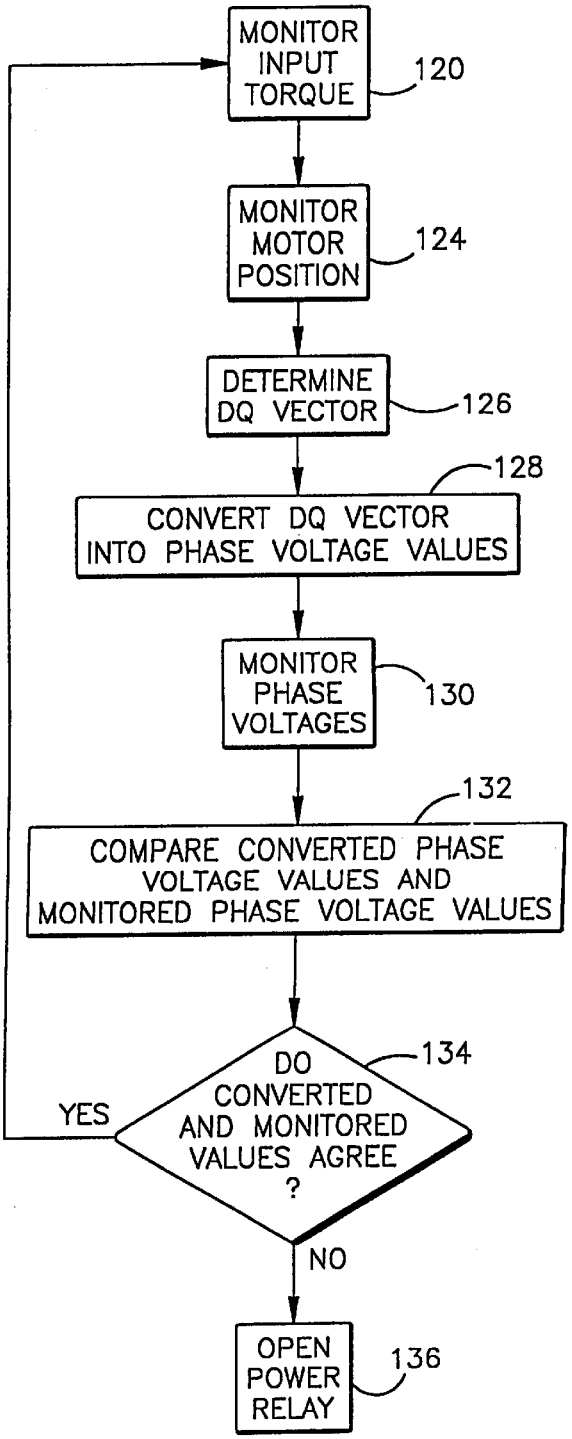
FIG. 3 is a flow diagram illustrating the operation of a second controller of the system of FIG. 1 in accordance with a preferred embodiment of the present invention.

In FIG. 3, the control process of the secondary controller 54 begins at step 120 by the secondary controller monitoring the applied input torque signal 24.

Next, the process continues to step 124 with the secondary controller 54 monitoring the relative position between the rotor and stator of the motor 22. The motor position data is provided through the motor position signal 40 from the motor position sensor 36.

The process then proceeds to step 126 where the secondary controller 54 determines a DQ vector as a function of the applied steering torque and motor position. It is known that motor torque may mathematically be determined as the vector cross product of the rotor flux and the stator magnitomotive force ("MMF"). The DQ vector control analysis is a two-dimensional representation of a motor current or voltage corresponding to the value of the applied steering torque indicated by the applied torque signal 24. The DQ vector may be represented as either a voltage or current vector, each having a D-axis component and a Q-axis component in the rotating coordinates. The D-axis refers to the direct or permanent flux linkage associated with the rotor magnets of the electric assist motor 22, i.e., the rotor flux. The Q-axis refers to the stator MMF, which leads the rotor flux by 90°, i.e., it is in quadrature with the D-axis.

Because the relative position of the rotor and stator is known, the individual D-axis and Q-axis components of motor voltage or current are determined by DQ transformation as a function of the applied torque value and the motor position value.

The determined DQ vector value is a two-dimensional vector representation of the motor current or motor voltage corresponding to the three-phase motor current or voltage values as determined by the main controller 26. The accuracy of the DQ transformation is improved by obtaining a relatively high resolution motor position value from the motor position sensor 36. Accordingly, the motor position sensor may include a plurality of sensing devices configured to provide the desired high resolution indication of motor position.

The process proceeds to step 128 where the secondary controller 54 converts the DQ vector value into a three-phase voltage value by applying an appropriate DQ transform to the previously determined DQ vector value. Provided that the main controller and secondary controller are operating properly, the converted three-phase voltage or current values should agree with the actual voltage or current values of the electric assist motor 22.

The process continues to step 130. In step 130, the secondary controller 54 monitors the phase voltages currents of each phase A, B, and C of the electric assist motor 22. The converted phase voltage values and the monitored phase voltage or current values are appropriately normalized to a desired voltage level, suitably according to the voltage level from voltage regulator 34.

The process proceeds to step 132 where the secondary controller 54 compares the converted phase voltage values and the monitored phase voltage or current values. This determination is made to verify that the electric assist motor 22 is operating at a level corresponding to the applied steering torque. This, in turn, also verifies whether the electric motor 22 and the drive circuit 44 are responding properly to the current command signals 42 from the main controller 26.

The process then proceeds to step 134 where it is determined whether the converted phase voltage values agree with the monitored phase voltage values of the electric assist motor 22, i.e., are they within a predetermined amount. If the determination is affirmative, the process returns to step 120 where the process repeats. On the other hand, if the determination is negative, such as where the converted phase values differ from the monitored phase values by a predetermined amount, the process proceeds to step 136.

In step 136, the secondary controller 54 provides signal 60 to the power relay 62 so as to disable the electric assist motor 22. Upon receiving the signal 60, the power relay 62 deactivates the electric assist motor 22 by disconnecting the motor 22 from the power supply 32.

Figure 4:
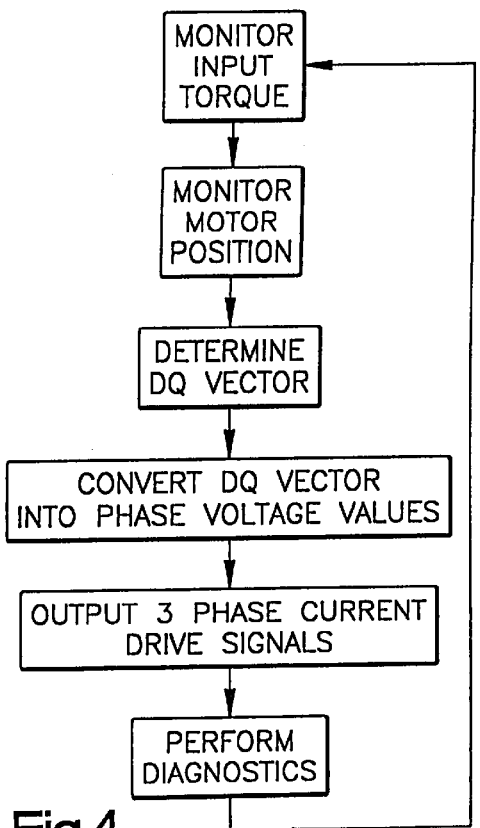
FIG. 4 is a flow diagram illustrating the operation of the first controller of the system of FIG. 1 in accordance with an alternative preferred embodiment of the present invention.

While the main controller 26 described above preferably utilizes a look-up table to determine the three-phase current command signal 42, it will be appreciated that, alternatively, the current command signal may be determined in using a DQ vector transformation, as illustrated in FIG. 4 and described above with respect to the secondary controller 54. With the main controller using DQ vector transformation, the secondary controller could utilize either DQ transformation, as described above, or it could be configured to include a look-up table to determine the phase voltage or current values. The secondary controller 54 then would confirm the proper operation of the electric motor 22 as described above.

The secondary controller 54 also may be configured to communicate with the main controller 26 over communication link 66. Such communication could be used to effect an incremental increase or decrease in the current command signal 42 in response to the results of the comparison performed by the secondary controller 54.

It further will be understood that, rather than the secondary controller 54 transforming the DQ vector values to three phase voltage or current values prior to step 134, the monitored three phase voltage or current values from the monitoring device 58 could be transformed into DQ axis components. The values of such monitored DQ axis components are then compared with the corresponding values of the determined DQ vector to determine whether such values substantially agree. If the values do not agree (e.g., they differ by more than a predetermined amount) the secondary controller 54 disables the electric assist motor 22 through activation of the power relay 62, as described above.

It should also be appreciated that the functions performed by the two controllers 26, 54 could be accomplished using a single controller.

A method for controlling an electric assist motor in accordance with the present invention comprises determining a first set of motor control values in response to applied steering torque, energizing the electric motor in response to the first set of motor control values, the motor having operating values when energized, determining a motor control value from the motor operating values, determining a second set of motor control values in response to the applied steering torque, and disabling the motor when the determined motor control value from the motor operating values is inconsistent with the determined second set of motor control values responsive to applied steering torque. Being inconsistent means that the signs of the determined values are not equal or that the determined values are different by a predetermined amount.

From the above description of the invention and the included appendices, those skilled in the art will perceive improvements, changes and modifications. Such improvements, changes and modifications within the skill of the art are intended to be covered by the appended claims.

Having described the invention, the following is claimed:

1. A method for controlling an electric assist motor comprising:
    energizing the electric assist motor, the electric assist motor having operating values when energized;
    determining a first set of motor control values from the motor operating values;
    determining a second set of motor control values in response to the applied steering torque; and
    disabling the electric assist motor when said first set of motor control values is inconsistent with said second set of motor control values.

2. The method of claim 1 wherein the electric assist motor is a multi-phase motor and said step of energizing said electric assist motor comprises determining DQ values as a function of at least a monitored input torque and motor position.

3. The method of claim 1 wherein said step of determining said first set of motor control values includes determining DQ values as a function of at least a monitored motor current and position.

4. The method of claim 3 wherein said step of determining a second set of motor control values includes determining a second set of DQ motor control values in response to the applied steering torque.

5. The method of claim 4 wherein said step of disabling includes comparing a first determined Q value which is a function of the monitored motor current and position with a second determined Q value which is a function of the applied steering torque, said electric assist motor being disabled when at least one of signs of said first and second Q values and magnitudes are inconsistent.

6. The method of claim 1 wherein the electric assist motor is a multi-phase motor and said step of energizing said electric assist motor comprises determining motor control values as a function of at least a monitored input torque and motor position.

7. A method for controlling an electric assist steering system having a permanent magnet AC motor, said method comprising the steps of:
    determining first motor control values in response to an applied steering torque;
    energizing said motor based on the first motor control values, the motor having operating values when energized;
    determining second motor control values using a DQ transformation; and
    disabling said motor when said operating values and said second control values are not consistent.

8. A method as set forth in claim 7 wherein said step of determining first motor control values further comprises determining the first motor control value using a look-up table.

9. A method as set forth in claim 7 wherein said step of determining first motor control values further comprises determining the first motor control values using a DQ transformation.

10. An apparatus for controlling an AC electric motor having a plurality of phases comprising:
    a first controller operative to receive an applied torque signal and a motor position signal, said first controller providing output signals operative to energize each phase of the electric motor in response to the applied torque signal and said motor position signal;
    a second controller operative to receive the applied torque signal, the motor position signal, and monitored phase signals indicative of at least one of a voltage or current condition of each phase of the electric motor, said second controller determining a DQ vector value according to the applied torque signal, the DQ vector value being indicative of at least one of a voltage condition and a current condition corresponding to the applied torque signal, said second controller transforming the DQ vector value into calculated phase values indicative at least one of a voltage and a current for each phase of the electric motor according to the motor position signal; and
    a relay device operatively connected with the electric motor, said relay device being effective to disable the electric motor if the calculated phase values disagree with the monitored phase signals of the electric motor.

11. An electric assist steering system comprising:
    a torque sensor which senses an applied steering torque and provides an applied torque signal;

a motor position sensor which senses the relative position between the rotor and the stator of an AC permanent magnet electric assist motor and provides a high resolution motor position signal indicative thereof;

a first controller operative to control energization of the electric assist motor in response to the applied torque signal and said motor position signal;

a second controller which determines a DQ vector value indicative of at least one of motor voltage and motor current as a function of the applied torque signal, said second controller transforming the DQ vector value into transformed values including at least one of a transformed phase voltage value and a transformed phase current value for each phase of the electric assist motor, said second controller determining monitored phase values including at least one of a voltage and current of each phase of the electric assist motor and comparing the transformed phase values with the monitored phase values and said second controller detecting an abnormality in said system if the transformed phase values are inconsistent with the monitored phase values.

12. A system as set forth in claim 11 further comprising a relay device, wherein said second controller provides a relay signal upon said second controller detecting the abnormality in said system, said relay device disabling the electric assist motor in response to the relay signal of said second controller.

13. A method for controlling an electric assist steering system having a permanent magnet electric assist motor comprising the steps of:

monitoring an applied steering torque;

determining an assist drive current value in response to the monitored applied steering torque from a lookup table;

energizing the electric assist motor in response to the determined drive current value;

monitoring a value corresponding to at least one of a motor voltage value and a motor current value of the electric assist motor when energized by the drive current value;

monitoring motor position;

determining a first DQ vector value in response to said the monitored motor position and the monitored value corresponding to at least one of a motor voltage value and a motor current value;

determining a second DQ vector value in response to applied steering torque;

comparing the first and second DQ vector values; and disabling the electric assist motor if said step of comparing indicates inconsistent first and second DQ values.

14. A method for controlling an electric assist motor of an electric assist steering system, said method comprising the steps of:

monitoring an applied steering torque;

monitoring a motor position of the electric assist motor;

determining a DQ vector as a function of said applied steering torque and said motor position;

determining calculated phase values as a function of said DQ vector;

monitoring actual phase values of the electric assist motor;

comparing said calculated phase values to said actual phase values; and determining a motor fault condition when said calculated phase values are inconsistent with said actual phase values.

15. An electric assist steering system comprising:

an electric assist motor for providing assist torque to help steer steerable vehicle wheels;

a torque sensor for determining an applied steering torque;

a motor position sensor for determining a motor position of said electric assist motor;

a monitor for determining actual phase values of said electric assist motor; and a controller operative to control energization of said electric assist motor in response to said applied steering torque and said motor position, said controller being further operative to determine a DQ vector as a function of said applied steering torque and said motor position, said controller determining calculated phase values as a function of said DQ vector and comparing said calculated phase values to said actual phase values, said controller being further operative to determine a motor fault condition when said calculated phase values are inconsistent with said actual phase values.

* * * * *